(12) United States Patent
Sprague et al.

(10) Patent No.: US 11,727,436 B2
(45) Date of Patent: *Aug. 15, 2023

(54) BROWSER PROOF OF WORK

(71) Applicant: Popdust, Inc., Wilmington, DE (US)

(72) Inventors: Michael Sprague, New York, NY (US); George Mario Fortuna, Cold Spring, NY (US); Sameet U. Durg, New York, NY (US); Joseph A. Fortuna, Jr., Lake Huntington, NY (US)

(73) Assignee: Popdust, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,424

(22) Filed: Sep. 8, 2021

(65) Prior Publication Data

US 2022/0067780 A1    Mar. 3, 2022

Related U.S. Application Data

(63) Continuation of application No. 15/910,723, filed on Mar. 2, 2018, now Pat. No. 11,120,469.

(Continued)

(51) Int. Cl.
*G06Q 30/00* (2023.01)
*G06Q 30/0241* (2023.01)
(Continued)

(52) U.S. Cl.
CPC ....... *G06Q 30/0248* (2013.01); *G06Q 20/047* (2020.05); *G06Q 20/12* (2013.01)

(58) Field of Classification Search
None
See application file for complete search history.

(56) References Cited

U.S. PATENT DOCUMENTS 9,767,263 B1    9/2017    Mcinerny et al.
10,229,424 B1    3/2019    Liu et al.
(Continued)

OTHER PUBLICATIONS

Notice of Allowance and Fee(s) Due for U.S. Appl. No. 15/910,723, titled "Browser Proof of Work," dated May 4, 2021.

(Continued)

*Primary Examiner* — Kambiz Abdi
*Assistant Examiner* — Christopher Stroud
(74) *Attorney, Agent, or Firm* — Hamilton, Brook, Smith & Reynolds, P.C.

(57) ABSTRACT

Embodiments are directed to methods and systems for determining the identity of a user as a person or a robot. In some embodiments, the methods and systems engage a web browser to produce a token and calculate a computation cost associated with the token production. The methods and systems use the computation cost to prove that the web browser on a device not handicapped by the computational challenge of producing tokens, which would handicap a robot. In some embodiments, the methods and systems generate a cookie based on a confirmed user purchase, and record the user identity contained in the cookie at a block chain to identify the user as a verified purchaser. The methods and systems may later retrieve the cookie and search the block chain using the user identity contained in the cookie. By locating the user identity in the block chain, the methods and systems know that the user is a verified purchaser, indicating the user to be a person, as robots cannot make purchases.

6 Claims, 6 Drawing Sheets

Related U.S. Application Data

(60) Provisional application No. 62/471,725, filed on Mar. 15, 2017.

(51) Int. Cl.
  *G06Q 20/12* (2012.01)
  *G06Q 20/04* (2012.01)

(56) References Cited

U.S. PATENT DOCUMENTS

| | | | |
|---|---|---|---|
| 10,361,869 B2 | 7/2019 | Gorman | |
| 11,120,469 B2 | 9/2021 | Sprague et al. | |
| 11,121,389 B2 | 9/2021 | Sprague et al. | |
| 2008/0281606 A1* | 11/2008 | Kitts | G06Q 30/02 |
| | | | 705/1.1 |
| 2010/0162404 A1 | 7/2010 | Dawson et al. | |
| 2012/0150641 A1 | 6/2012 | Dobbs et al. | |
| 2012/0324113 A1 | 12/2012 | Prince et al. | |
| 2013/0074150 A1 | 3/2013 | Soohoo | |
| 2014/0379902 A1* | 12/2014 | Wan | H04L 63/1441 |
| | | | 709/224 |
| 2017/0155513 A1* | 6/2017 | Acar | H04L 9/14 |
| 2017/0244709 A1* | 8/2017 | Jhingran | G06F 21/44 |
| 2017/0359373 A1 | 12/2017 | Jaladi et al. | |
| 2018/0144153 A1* | 5/2018 | Pead | H04L 9/3236 |

OTHER PUBLICATIONS

Non-Final Office Action for U.S. Appl. No. 15/910,723, titled "Browser Proof of Work," dated Feb. 21, 2020.
Final Office Action for U.S. Appl. No. 15/910,723, titled "Browser Proof of Work," dated Aug. 20, 2020.

* cited by examiner

BROWSER PROOF OF WORK

RELATED APPLICATIONS

This application is a continuation of U.S. application Ser. No. 15/910,723, filed on Mar. 2, 2018, now U.S. Pat. No. 11,120,469, issuing Sep. 14, 2021, which claims the benefit of U.S. Provisional Application No. 62/471,725 filed on Mar. 15, 2017. The entire teachings of the above applications are incorporated herein by reference.

BACKGROUND

A persistent problem on the Internet is distinguishing actual person users from programs or robots (bots).

User actions, such as registering page views, sending emails, and clicking on links are valuable if the users performing these actions are people. However, these same actions are less valuable if the users performing these actions are bots or spammers. Currently, web servers, mail servers, chat servers, and the like combat bot traffic using defensive methods, such as blacklisting problematic IP addresses and examining packet data. Previous attempts to tackle the problem of spam (e.g. sent by bots) include charging the sender of an email an inconsequential monetary amount/fund such as one tenth of a cent. The assumption was that due to the large volume of emails sent by spammer users, the spammer users would incur a significant bill, which would eventually lead to a drastic reduction in the number of people targeted by spammers. In contrast, an average user would never incur a significant bill because the average user's email volume would not be anywhere close to that of a spammer. One obstacle to implementing such a solution was the difficulty of collecting the charged funds from users. Moreover, such a solution required near universal adoption in order to be viable.

SUMMARY

Under the current model of online advertising, payment is made to an entity whenever a user clicks on an advertisement. If the user clicking on the advertisement is a person user, then the advertisement works as intended because the person user may be a potential customer. However, if the user clicking on the advertisements is a bot programmed to generate clicks, the advertisement fails to work as intended because the clicks are not associated with potential customers. Moreover, advertisers end up paying for the clicks even though their advertisements are not attracting potential customers.

The lack of a viable technique for distinguishing person users from bots prevents advertisers from effectively attracting potential customers. An example embodiment of the present invention solves the problems faced by existing techniques by employing methods and systems that distinguish person users from bots and thereby dissuading the auto generation of clicks on advertisements by bots and spammers.

Embodiments are directed to methods, systems, and computer program products that identify a user of a web browser by token production. The computer program products comprise a non-transitory computer-readable storage medium having code instructions stored thereon, the storage medium operatively coupled to a processor to execute the computer method embodiments. The systems include one or more processors configured to execute the computer method embodiments.

The methods, systems, and program products cause one or more web browsers running on corresponding one or more computing devices to each produce a token. In example embodiments, the respective produced token is time sensitive and expires after a set period of time. In some embodiments, the methods, systems, and program products cause a given web browser to produce a token in response to at least one of: user engagement in the web browser, a request by a web service, a period of elapsed time, and user engagement metrics (e.g., mouse movements). In some embodiments, the methods, systems, and program products tender the produced token to a software robot that provides a service desired by a user of a corresponding computing device. In some example embodiments, the methods, systems, and program products capture the produced token in a cookie associated with a corresponding web browser, and may sign the cookie using the captured produced token in the cookie.

The methods, systems, and program products, using a computational challenge, prove a computational cost of producing the respective token at each of the one or more computing devices. In some embodiments, proving the computational cost of producing the token at a given computing device is performed by an independent third party. In example embodiments, the computational cost of producing the respective token is based on the time taken to produce the token. In some embodiments, the computational challenge is provided by a server and confirmed by a third party communicatively coupled to the server. In some embodiments, the computational cost of producing the token is higher if a corresponding computing device is a server than if the corresponding computing device is a not a server. In example embodiments, the produced token and the computational cost of producing the token are valid for a pre-determined amount of time and expire after the pre-determined amount of time.

The methods, systems, and program products then decipher whether each of the one or more computing devices is being operated at least in part by a software robot based on the proven computational cost of the respective produced token.

In some embodiments, the methods, systems, and program products further calculate a confidence score indicating a likelihood of whether a given computing device is being operated at least in part by a software robot. The methods, systems, and program products may calculate the confidence score based on the proven computational cost of the respective produced token. The methods, systems, and program products may increase the confidence score for a given computing device, if one or more of: the proven computation cost is below a threshold value, the time to produce the token is above a threshold value, the given computing device includes a trusted platform module (TPM), and proof that a user of the given computing device participated in an online purchase is located.

Embodiments are directed to methods, systems, and computer program products that identify a user of a web browser by purchase receipts. The computer program products comprise a non-transitory computer-readable storage medium having code instructions stored thereon, the storage medium operatively coupled to a processor to execute the computer method embodiments. The systems include one or more processors configured to execute the computer method embodiments.

The methods, systems, and program products generate a receipt for an online purchase event performed by a user via a computing device. The methods, systems, and program products preserve the purchase receipt at the purchasing computing device and containing an identity of the purchasing user (e.g., username, user identifier, user PIN, and the like). In example embodiments, the purchase receipt is a cookie generated based on the online purchase event. In some embodiments, the generating of the purchase receipt includes executing a conversation pixel or script at a confirmation page for the online purchase event. The conversional pixel or script identifying the purchasing user in the purchase receipt as performing the online purchase. The methods, systems, and program products record the purchasing user identity contained in the purchase receipt at a secured database, the recording indicating the purchasing user as a verified purchaser. In some embodiments, the database is a blockchain. In some embodiments, the methods, systems, and program products sign and date the purchasing user identity prior to recording in the database The methods, systems, and program products receive a request from a service. provider in response to an activity (e.g., click of an online advertisement) conducted by a participating user via a participating computing device. In response to the request, the methods, systems, and program products locate a receipt on the participating computing device and an identity of the participating user contained in the located receipt. In some embodiments, a first script or pixel tag on the confirmation page is configured to generate the purchase receipt at the purchase computing device, and a second script or pixel tag on an advertising page is configured to locate the purchase receipt at the purchase computing device. The methods, systems, and program products search for the located participating user identity in the database. The methods, systems, and program products determine the participating user to be a person user based on the located participating user identity matching the purchasing user identity recorded in the database.

In some embodiments, the methods, systems, and program products are further configured to map the located identity to a network performing the search of the database, and wherein mapped identities on the network are randomized to only be meaningful to the network. In some embodiments, the methods, systems, and program products take into account the user deleted histories causing deletion of the cookies and use of a new machine without saved cookies by allowing a certain percentage of unverified users to continue to take action without successfully verification.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Digital Processing Environment

Figure 1A:
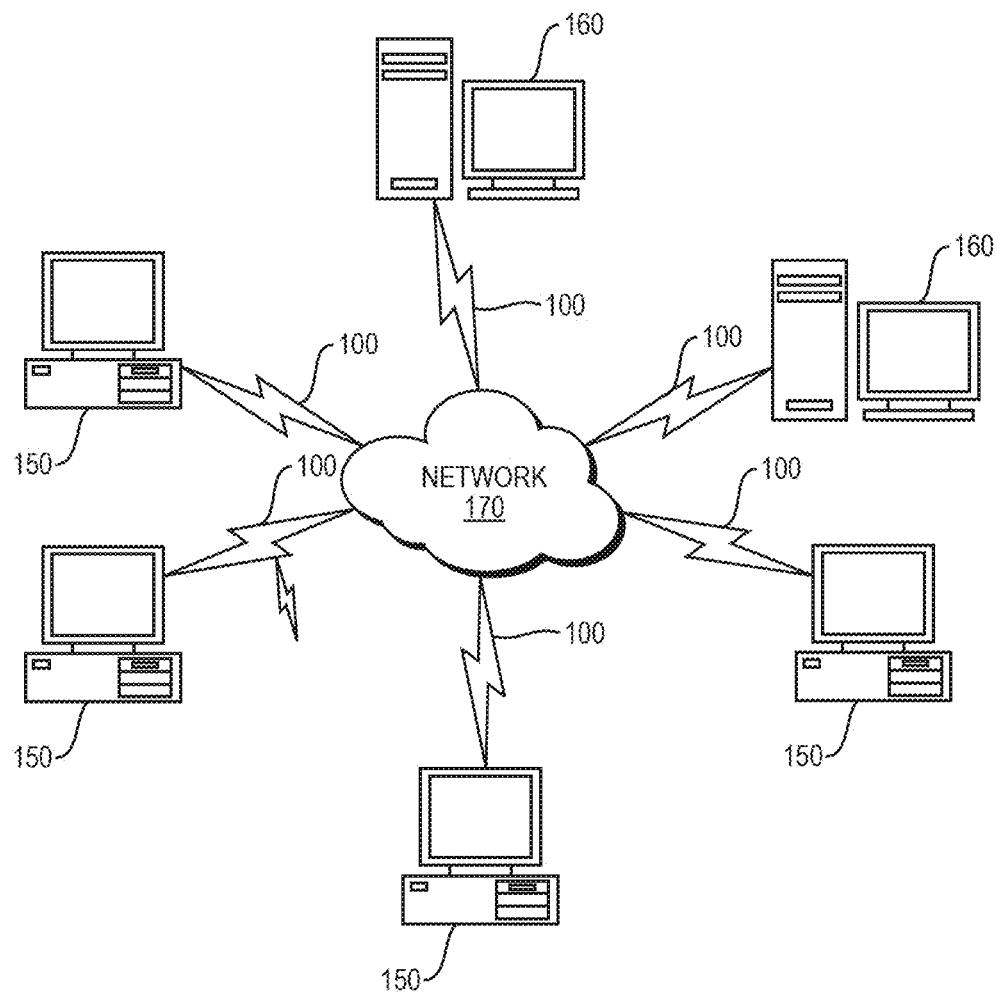
FIG. 1A is a diagram illustrating a computer network or similar digital processing environment in which the present invention may be implemented.

An example implementation of a system 100 according to the invention may be implemented in a software, firmware, or hardware environment. FIG. 1A illustrates one such example digital processing environment in which embodiments of the present invention may be implemented. Client computers/devices 150 and server computers/devices 160 (or a cloud network 170) provide processing, storage, and input/output devices executing application programs and the like. Client computers/devices 150 may be linked directly or through communications network 170 to other computing devices, including other client computers/devices 150 and server computer/devices 160.

The communication network 170 can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, etc.) to communicate with one another. The communication network 170 may also be a virtual private network (VPN) or an out-of-band network or both. The communication network 170 may take a variety of forms, including, but not limited to, a data network, voice network (e.g. land-line, mobile, etc.), audio network, video network, satellite network, radio network, and pager network. Other electronic device/computer networks architectures are also suitable.

Server computers 160 may be configured to provide system 100. The server computers may not be separate server computers but part of cloud network 170. The server computers 160 may include a token server that requests a web browser executing on a computing device to produce a token and calculates a computation cost associated with the web browser producing the token. The server computers 160 may also include a merchant server that provides a website at the web browser. The server computers 160 may also include an advertising proof server, which based on confirmation of a user's online purchase through the web site on the web browser, generates a purchase receipt (e.g., cookie) containing the user's identity on the user's computing device, which the advertising proof server may later locate to determine the user to be a verified purchaser. The server computers 160 (advertising proof server), based on confirmation of a user's online purchase, may sign, date, and write the user's identity to a database (block chain database) to record the user's participation in an online purchase. Client computers/devices 150 may include the user's computing device configured with a web browser for accessing websites, generating tokens, and accepting cookies to be written to the user's computing device.

Figure 1B:
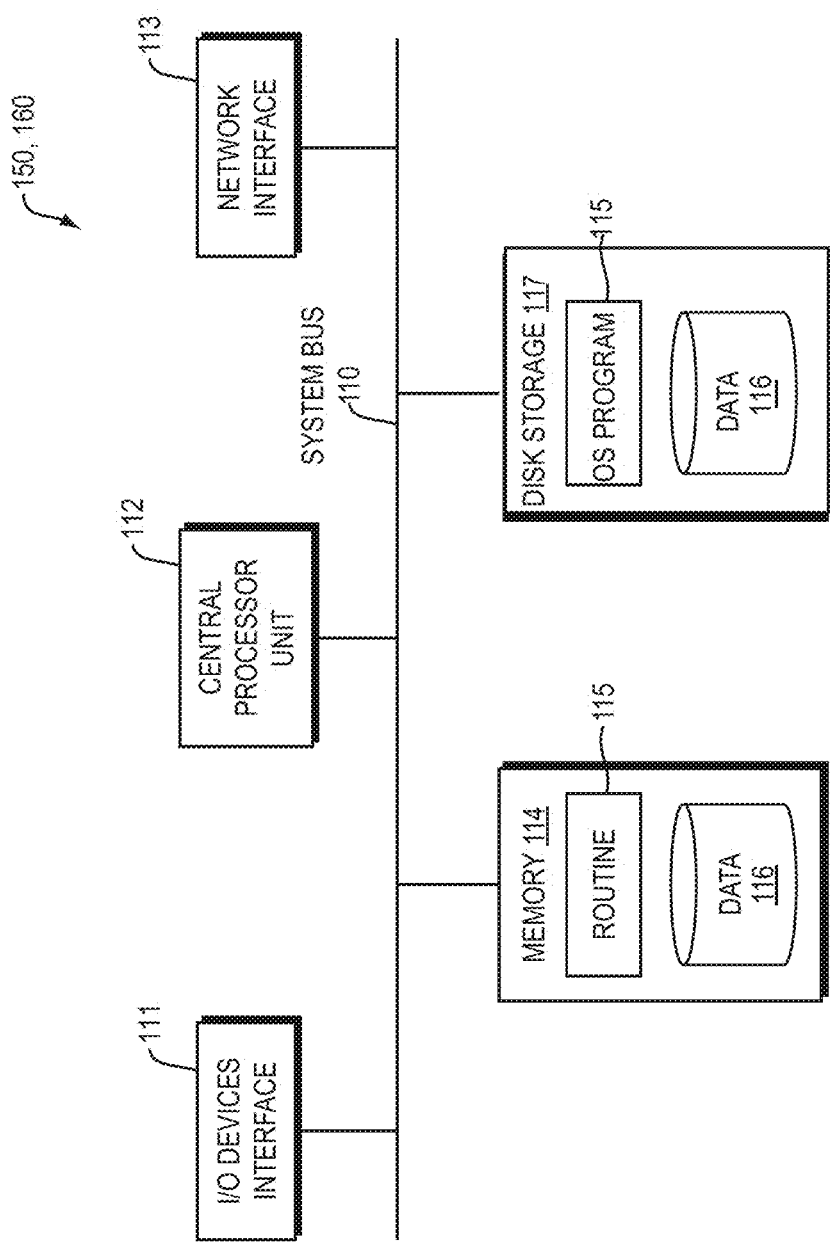
FIG. 1B is a block diagram of certain components of the computer nodes in the network of FIG. 1A.

FIG. 1B is a block diagram of any internal structure of a computer/computing node (e.g., client processor/device 150 or server computers 160) in the processing environment of FIG. 1A, which may be used to facilitate displaying audio, image, video or data signal information. Each computer 150, 160 in FIG. 1B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 1A). Memory 114 provides volatile storage for computer software instructions 115 and data 116 used to implement software implementations of some embodiments of the present invention. Such components 115, 116 of the system 100 described herein may be configured using any programming language, including any high-level, object-oriented programming language, such as Python. The components may include a component configured on a server computer 160 that requests a web browser configured on a user's device to product a token in response with user's online activities. Another component may be configured on the server computer 160 to determine computation cost associated with the generated token, which indicates the user's identity as a person or robot. The components may also include a component configured on a server computer 160 that receives information related to a user's online purchase and generates a purchase receipt (e.g., cookie) containing the user's identity on the user's computing device. Another component configured on the server computer 160 may record the user's identity contained in the purchase receipt at a block chain database as a verified purchaser. Further components may be configured on server computers 160 to locate the purchase receipt on the user's device and, based on the user's identity contained in the purchase receipt, search the database to locate the corresponding record.

In an example mobile implementation, a mobile agent implementation of the invention may be provided. A client server environment can be used to enable mobile security services using the server 190. It can use, for example, the XMPP protocol to tether a device authentication engine/agent 115 on the device 150 to a server 160. The server 160 can then issue commands to the mobile phone on request. The mobile user interface framework to access certain components of the system 100 may be based on XHP, Javelin and WURFL. In another example mobile implementation for OS X and iOS operating systems and their respective APIs, Cocoa and Cocoa Touch may be used to implement the client side components 115 using Objective-C or any other high-level programming language that adds Smalltalk-style messaging to the C programming language. The system may also include instances of server processes on the server computers 160.

Disk storage 117 provides non-volatile storage for computer software instructions 115 (equivalently "OS program") and data 116 used to implement embodiments of the system 100. The system may include disk storage accessible to the server computer 160. The server computer can maintain secure access to records related to the authentication of users registered with the system 100. Central processor unit (CPU) 112 is also attached to the system bus 110 and provides for the execution of computer instructions.

In an example embodiment, the processor routines 115 and data 116 are computer program products. For example, aspects of the system 100 may include both server side and client side components.

Software implementations 115, 116 may be implemented as a computer readable medium capable of being stored on a storage device 117, which provides at least a portion of the software instructions for the system 100. Executing instances of respective software components of the system 100, may be implemented as computer program products 115, and can be installed by any suitable software installation procedure, as is well known in the art. In another embodiment, at least a portion of the system software instructions 115 may be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g. a radio wave, an infrared wave, a laser wave, a sound wave, or an electrical wave propagated over a global network such as the Internet, or other networks. Such carrier medium or signal provides at least a portion of the software instructions for the present system.

System For Identifying User Based on CPU Power Usage

The advent of block chain technology suggests a different approach to the problem of discouraging spammers. With block chain technology, CPU power, rather than a monetary amount can be the basis for distinguishing a person user from a program or bot. This is known as proof of work on the block chain. A proof of work is a piece of data which is difficult (costly, time-consuming, etc.) to produce but is easy for others to verify to satisfy certain requirements.

Typically, the device (machine) of an individual person can accept requests to produce tokens for the person's small volume of email. The producing of the tokens would require the machine to do some work in the background requiring minimal CPU power, and, therefore, without any significant disruption to the person user. In contrast, the computing system of a bot would likely be handicapped if it had to produce a token proving work for the high volume of clicks on advertisements or sent spammed emails by the bot (e.g., proving two seconds of work for every click).

Embodiments are systems and methods that engage a web browser to produce a token for proving such work. The produced token thereby proving whether the web browser is installed on a machine that is handicapped by doing a few seconds of math to produce the token. Such systems or methods according to embodiments can be implemented in JavaScript and the token captured in a cookie associated with the web browser, thus, neatly fitting into an existing web services network. The cookie may be signed using the captured token in the cookie. The value of the produced token and the time duration of its validity can change based on different situations and conditions.

Attempting to circumvent these systems and methods, while not impossible, would be costly for a bot or spammer. For example, a spammer can allocate several servers in order to obtain the computing power required for producing tokens for each click or send email by the spammer. However, obtaining even a few servers can be costly. Therefore, the systems and methods would dissuade even a person user from making a living by generating advertisement clicks or sending spammed emails.

According to some embodiments, a machine is requested to produce a token in the background while the person user is, for example, reading an online article. Thus, while the user is engaged in reading the article, a background request to produce a token is used for determining whether the user is a person user or a bot.

Figure 2A:
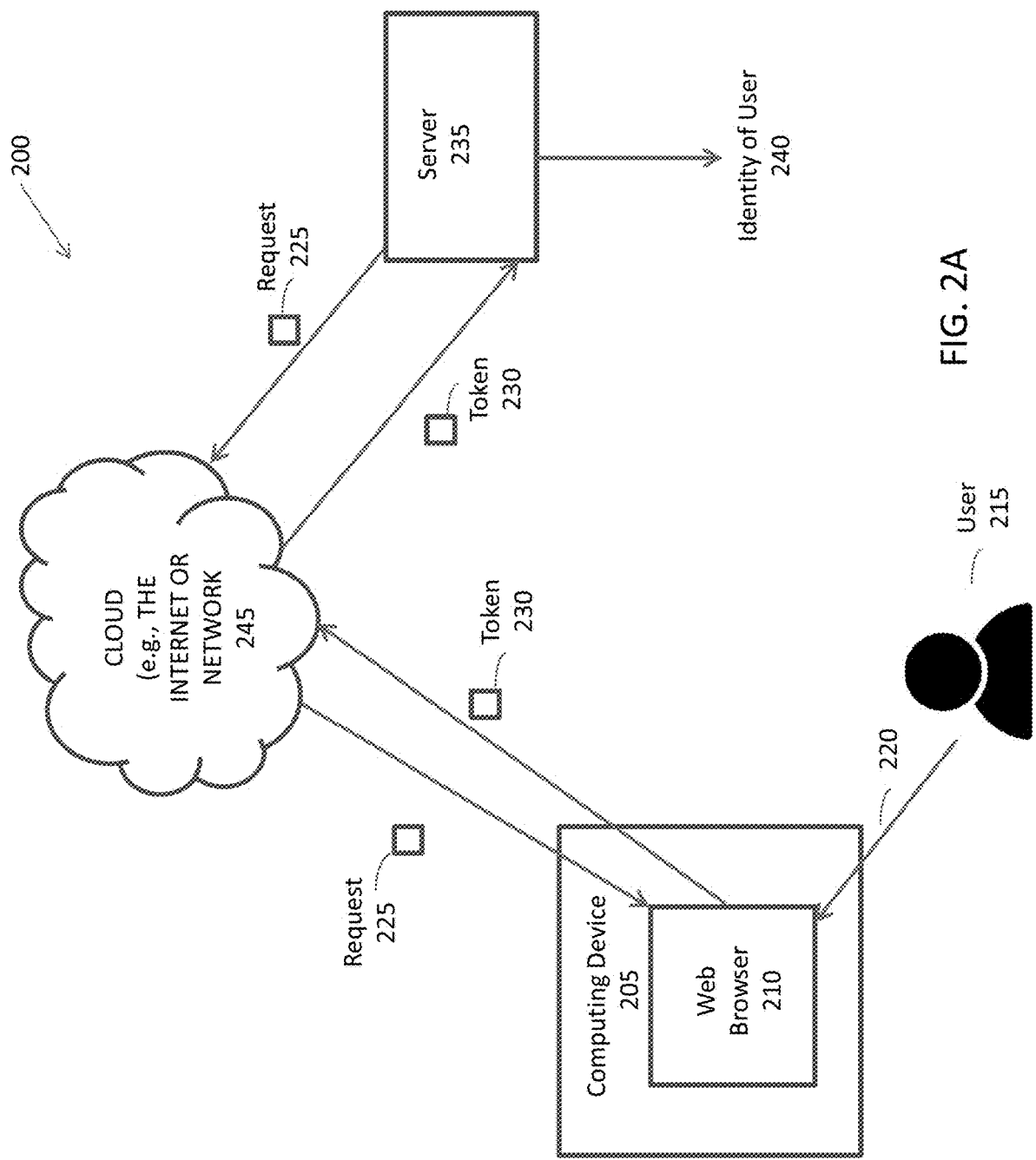
FIG. 2A is a block diagram of an example system that distinguishes users based CPU usage according to an embodiment of the present invention.

FIG. 2A shows an example of a user identification system 200 according to an embodiment of the invention. A User 215 interacts via User Input 220 with a website displayed via a Web Browser 210 running on Computing Device 205, such as clicking an advertisement on the displayed website. The interaction is communicated to Server (Token Server) 235. For example, a transparent pixel or script may be placed on the displayed website to communicate the interaction to the Server 235.

An application executing on the Server 235 determines whether the User 215 is a software robot or a person user by issuing a Requests 225 to Web Browser 210 to produce a token. The Request 225 is sent over a network 245. In response to Request 225, Web Browser 210 produces a Token 230 on Computing Device 205. The Token 230 is sent to the Server 235 over network 245. The application executing on Server 235 determines (e.g., using a computational challenge) a computational cost of producing the Token 230. In some embodiments, the computational cost of producing the Token 230 is based on the time taken to produce the Token 230. Based on the computational cost of producing the Token 230, the application on Server 235 determines (deciphers) whether the User 215 is a software robot or a person user. In some embodiments, proving the computational cost of producing the Token 230 at the Computing Device 205 is performed by an independent third party, rather than the application executing on Server 235.

An application that determines whether the User 215 is software robot or a person user may also exist locally on the Computing Device 205. In this embodiment, it would not be necessary to send Request 225 or Token 230 over a network 245.

In some embodiments, the Request 225 is issued in response to particular user engagement in the Web Browser 210 and based on user engagement metrics, including mouse movements by the user. Request 225 can also be issued in response to an elapsed period of time or issued by a web service.

System For Identifying User Based on Transaction Activities

Block chain technology may be utilized in other manners to distinguish a person user from a program or bot. The open block chain may be used to preserve and provide receipts from previous online transaction activities (e.g., purchases) of a person user. Unlike a person user, a machine (program or bot) cannot be a true participant in the Internet economy, as a machine does not have the ability to perform and complete online transactions (purchases) of value. Embodiments of the present invention generate and preserve an online receipt of an online transaction completed by a person user. Then, later when a user views or clicks on an advertisement, these embodiments check for the preserved online receipt of the past online transaction completed by the user. If such an online receipt is located for the user, then these embodiments may determine the user to be a person user (as bot users cannot complete online transactions to product online receipts). For example, the checking of online receipts in these embodiments may be similar to requiring a user to present a utility bill to verify the user's identity for signing a contract.

Embodiments of the present invention are directed to systems and methods of generating and preserving online receipts for online transaction (e.g., purchases) events by person users. In these embodiments, a person user completes an online purchase via a web browser configured on the device of the user, thereby displaying a purchase confirmation webpage by the merchant website.

In some embodiments, the systems and methods place a pixel conversion (pixel tag and container) on the purchase confirmation webpage of a merchant website. A pixel conversion (tag) is a tiny transparent image placed on the purchase confirmation webpage of the merchant website. The pixel conversion is provided by an advertising entity to communication information related to the purchase to a server (referred to as a "proof server") on the advertising entity network. In other embodiments, the systems and methods similarly place a script (with a script tag), rather than a pixel conversion, on the purchase confirmation webpage to communicate purchase-related information to the proof server on the advertising entity network. In these embodiments, when the systems and methods render the purchase confirmation webpage, the pixel tag or script tag triggering provide the purchase-related information to the proof server. The purchase-related information may associate an advertiser impression with the identity of the user that made the purchase. The purchase-related information may include any information, without limitation, related to the online purchase performed by the user on the merchant web site and identity of the user.

Based on the purchase-related information, the systems and methods, by the proof server from its advertising network entity domain, generates (writes) a proof of purchase cookie (i.e., receipt of purchase transaction) on the user device. The proof of purchase cookie may include some or all of the purchase-related information, including the identity of the person user (e.g., username, user identifier, user PIN, and the like). The systems and methods may further enable the merchant website or proof server to sign and date an entry indicating the identity of the user and submit the entry to an open block chain database for recordation. The entry being recorded at the block chain or other secure network database enables participation proof of the user's purchase transaction to be shareable, tamper-proof, and under the control of no particular entity.

In some embodiments, the advertising proof server is replaced by one or more independent servers in the domain of another entity. In these embodiments, to enable the one or more independent servers to read a proof of purchase cookie originally generated by the proof server, the one or more server register to execute under the same top level domain. In this way, in other embodiments, the independent servers may access additional web browser attributes, along with the proof of purchase cookie. An organization may maintain the name of this domain and allow the domain to be accessed by the independent servers using of syntax, such as <registrantId>.ProofOfParticipation.org.

These embodiments are further directed to systems and methods of accessing the participation proof of a user's purchase transaction. When a website participating in advertising, receives a qualifying click or view event by a user (also referred to as a participating user) via a user device (also referred to as a participating user device), a computer on the network of the participating web site transmits a request to the proof server. The request is configured to prompt the proof server to locate (look up) a proof of purchase cookie on the participating user device. The proof server may determine the user's identity from this cookie.

The proof server may return the determined user identity to the network computer. With the user's identity in hand, the participating website may then lookup the user's identity in the block chain to discover whether an entry of the user's participation in a purchase transaction is recorded in the block chain. Such an entry being present in the block chain confirms to the participating website that the user is a verified past purchaser, and, thus, is a real person user (not a robot). In other embodiments, the proof of purchase cookie read from the user device may itself be used as confirmation of the user's purchase, without looking up the user's identity in the block chain or other such secure network database.

In some embodiments, the network computer of the participating website may map the user's identity within its domain to prevent unnecessary processing associated with looking up the identity at the proof server. Further, in this way, the systems and methods may enable the proof server to accept cookie swaps, whereby other advertising networks, such as Facebook, Google, Outbrain, and the like, map an identity of a purchaser (person user) to its domain. This mapping allows the other advertising networks to efficiently access a proof of purchase cookie of a particular webpage on the user device without requiring a web browser script tag for accessing the cookie by the proof server. In some embodiments, the systems and methods further avoid collusion in allowing the proof server to gain knowledge of which identities from different networks (associated with different cookies) are the same person. To do so, the systems and methods individually randomize the swapped identities; such the randomized identities are only meaningful within the respective network.

Figure 2B:
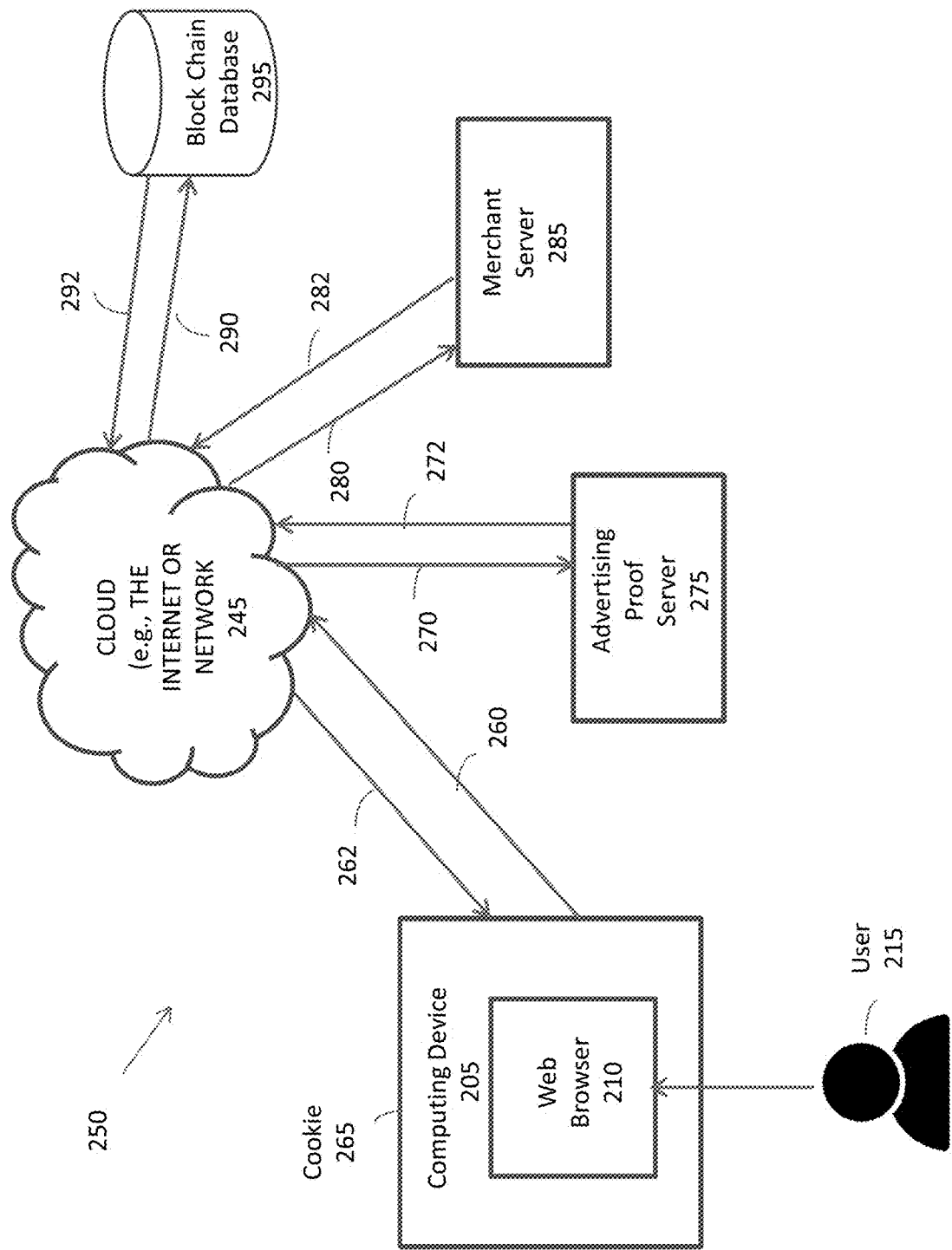
FIG. 2B is a block diagram of an example system that distinguishes users based on transaction activities according to an embodiment of the present invention.

FIG. 2B shows an example of user identification system 250 according to an embodiment of the invention. In some embodiments, the system 250 of FIG. 2B may be combined with the system 200 of FIG. 2A to implement a single user identification system with the features of both systems 200, 250.

In FIG. 2B, a User 215 interactions via Web Browser 210 running on Computer Device 205 to complete an online purchase with a Merchant. The Web Browser 210 communications over Network Interfaces 260, 262, 280, 282 (via the Network 245) to display webpages of the Merchant Website from Merchant Server 285 to enable the User 215 to complete the online purchase. The information on the purchase (including identity of the User 215) is provided to the Merchant Server 285 via these communications. As part of these communications, the Merchant Sever 285 displays a purchase confirmation webpage to the User 215 via Web Browser 210 on Computing Device 205. The displayed purchase confirmation webpage containing a pixel conversion image or script for providing the information on the purchase (including the identity of the User 215) to Advertising Proof Server 275 over Network Interfaces 260, 270.

Based on the provided purchase information, the Advertising Proof Server 275 generates a Proof Cookie 265 that contains the identity of the User 215 to the purchase made via the Merchant webpages. The Advertising Proof Server 275 communicates over Network Interfaces 272, 262 to write the Proof Cookie 265 on the Computing Device 205 (and associated with the Web Browser 210). In addition, based on the purchase information, the Merchant Server 285 signs and dates an entry containing the identity of the User 215 and records the entry at the Block Chain Database 295 over Network Interfaces 282, 292 (via Network 245) as proof of the User 210 being a verified purchaser.

At a future time, User 215 takes action on (e.g., views or clicks) an advertisement of a participating Merchant website displayed via the Web Browser 210 on Computing Device 205. In FIG. 2B, the Merchant is depicted as the same Merchant in which a purchase was previously made by User 215. However, the Merchant may be any merchant participating in the qualifying of online actions of users. In response to the action, the Merchant Server 285 communicates with the Advertising Proof Server 275 to request the identity of the User 215 taking the action using the Computing Device 205. The Merchant Server 285 and Advertising Proof Server 275 communicate over Network Interfaces 270, 272, 280, 282 (via Network 245). In response, the Advertising Proof Server 275 looks up the Proof Cookie 265 from the Computing Device 265 and returns the identity of the User 215 contained in the Proof Cookie 265 to the Merchant Server 285. The Merchant Server 285 then searches for this returned identity of the User 215 at the Block Chain Database 295 to determine that the User 215 is recorded as being a verified purchaser. The Merchant Server 285 communicates with the Block Chain Database 295 via Network Interfaces 280, 282, 290, 292 (via Network 245).

Based on the identity of User 215 being in the Block Chain Database 295, the Merchant Sever 285 can confirm User 210 as a person user (as a robot user cannot complete online purchases). The Merchant Server 285 may then allow the User 215 to take the action based on being a person user. Note, in some embodiments, the proof server may take into account the user deleting histories (causing the deletion of the cookies) or using a new machine (without saved cookies) by allowing a certain percentage of unverified users to continue to take the action without successfully verification. In other embodiments, an option may be provided to a User 215 to remain unverified, for example, to prevent being presented with online target advertising when visiting websites.

Confidence Score

In some embodiments the application on Server 235 of FIG. 2A calculates a confidence score and metrics associated with whether the User 215 operating Computing Device 205 is at least in part by a software robot or a person user. Once the application on Server 235 determines whether User 215 is a software robot or a person user, the application on Server 235 returns the Identity of the User 240 and a calculated confidence score, which is associated with a likelihood of whether Computing Device 205 is being operated by a software robot or a person user. Thus, the calculated confidence score indicates a confidence value regarding the user identification. The confidence score helps the relying party determine a measure of confidence about the Identity of the User 240.

The confidence score can be based on many different factors. One factor is the computational cost of the produced Token 230. If the proven computation cost is low (below a threshold value), the confidence score may be increased. Further, if Computing Device 205 is a server, the computational cost is higher than if the Computation Device 205 is an individual machine, and thus the confidence score may be increased. The confidence score may be based on the time it took Computing Device 205 to produce the Token 230. For example, longer times (e.g., above a time threshold) for producing Token 230 may be associated with a higher likelihood that the Identity of the User 240 is a software robot and a lower likelihood that the Identity of the User 240 is a person user. In another embodiment, the confidence score is increased if the Computing Device 205 includes a TPM (Trusted Platform Module).

According to some embodiments, produced Token 230 is captured in a cookie. In an embodiment, the captured produced token and the computational cost of the captured produced Token 230 are time sensitive and expire after a period of time. Captured cookies can sign cookies generated in the future thus, building up proof of whether the Web Browser 210 running on Computing Device 205 is being operated by a person user or a bot. The building up of proof results in a longer block chain, making it increasingly difficult for a web browser running on a machine that is operated by a bot to continue to produce tokens.

In some embodiments, the confidence score may be calculated to further consider the confirmed purchase activities of the user. The score may increase when determined that a user is a verified purchaser who previously completed an online purchase. The proof of a user being an online purchaser, such as a retrieved proof of purchase cookie associating the user's identity to an entry in a database of confirmed purchases may increase the confidence score. For example, a retrieved proof of purchase cookie associating the user's identity particularly to a persistent entry in a block chain database of confirmed purchases may further increase the confidence score. That is, the trusted confirmation of the user as a verified purchaser may be associated with a higher likelihood (confidence) that the identity of the user is a person (rather than a software robot).

Method of Identifying User Based on CPU Power Usage

Figure 3A:
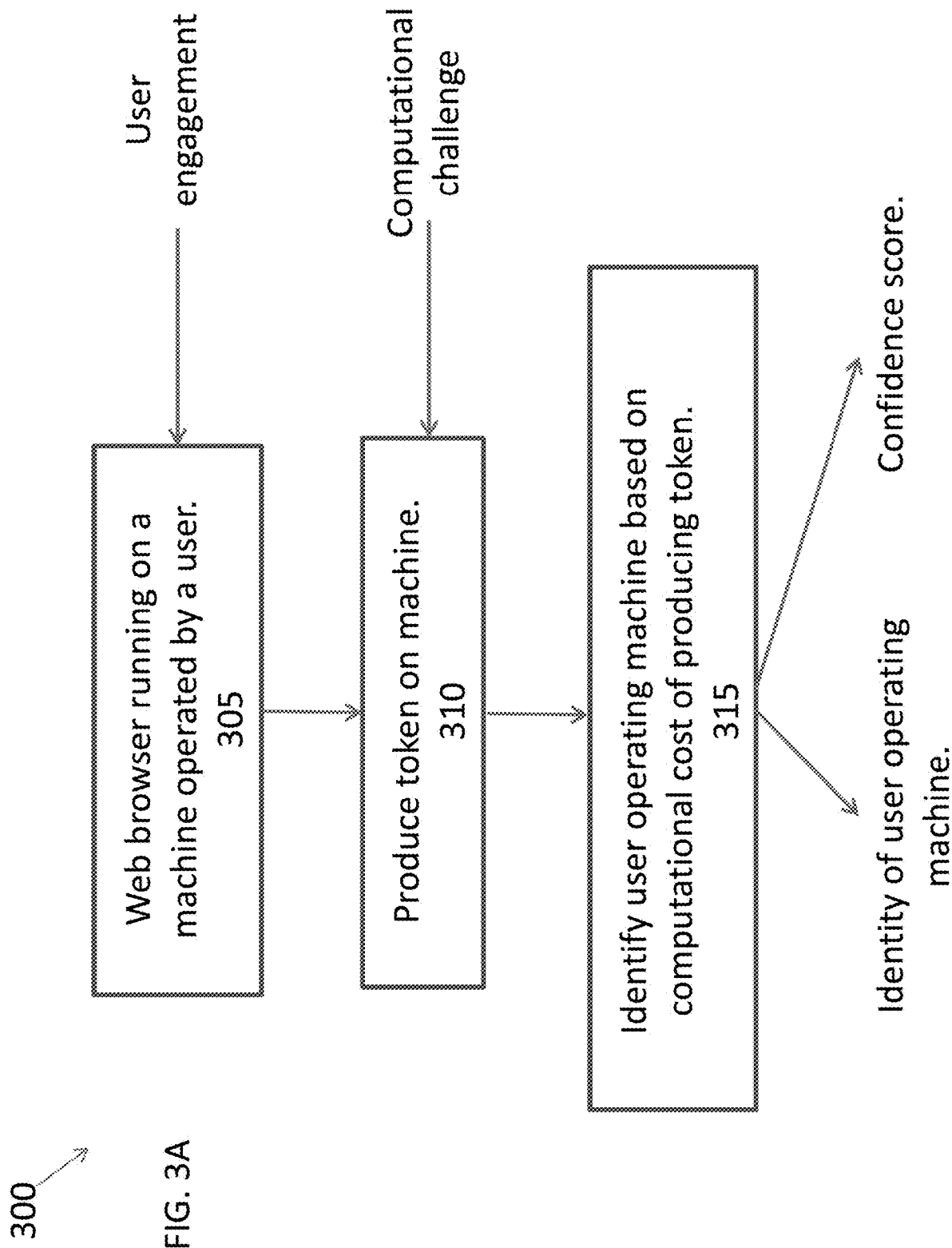
FIG. 3A is a flow diagram illustrating an example method of distinguishing users based on CPU usage according to an embodiment of the present invention.

FIG. 3A is flow diagram 300 of a method distinguishing users based on CPU usage according to an embodiment of the present invention. A web browser operated by a user runs on a machine 305. In response to user engagement in the web browser, the web browser issues a request to produce a token on the machine 310, using a provided computational challenge and the machine's computing resources. In some embodiments, the web browser is requested to produce the token by a web service or other third party. In some embodiments, the web browser issues a request to produce a token after a period of time has elapsed or based on user engagement metrics such as mouse movements. Based on proving (calculating) the computational cost of producing the token on the machine and other metrics, the process identifies the user operating the machine as a software robot or a person user 315. In some embodiments, proving the computational cost of producing the token is performed by an independent third party.

In some embodiments, the process also calculates a confidence score which is associated with a likelihood of whether the web browser is being operated by a software robot or a person user. In some embodiments, the produced token and the computational cost of producing the token are valid for a pre-determined amount of time and expire after the pre-determined amount of time. In example embodiments, the produced token is tendered to a software robot that provides a service desired by a user of a corresponding computing device.

Method of Identifying User Based on Purchase Activities

Figure 3B:
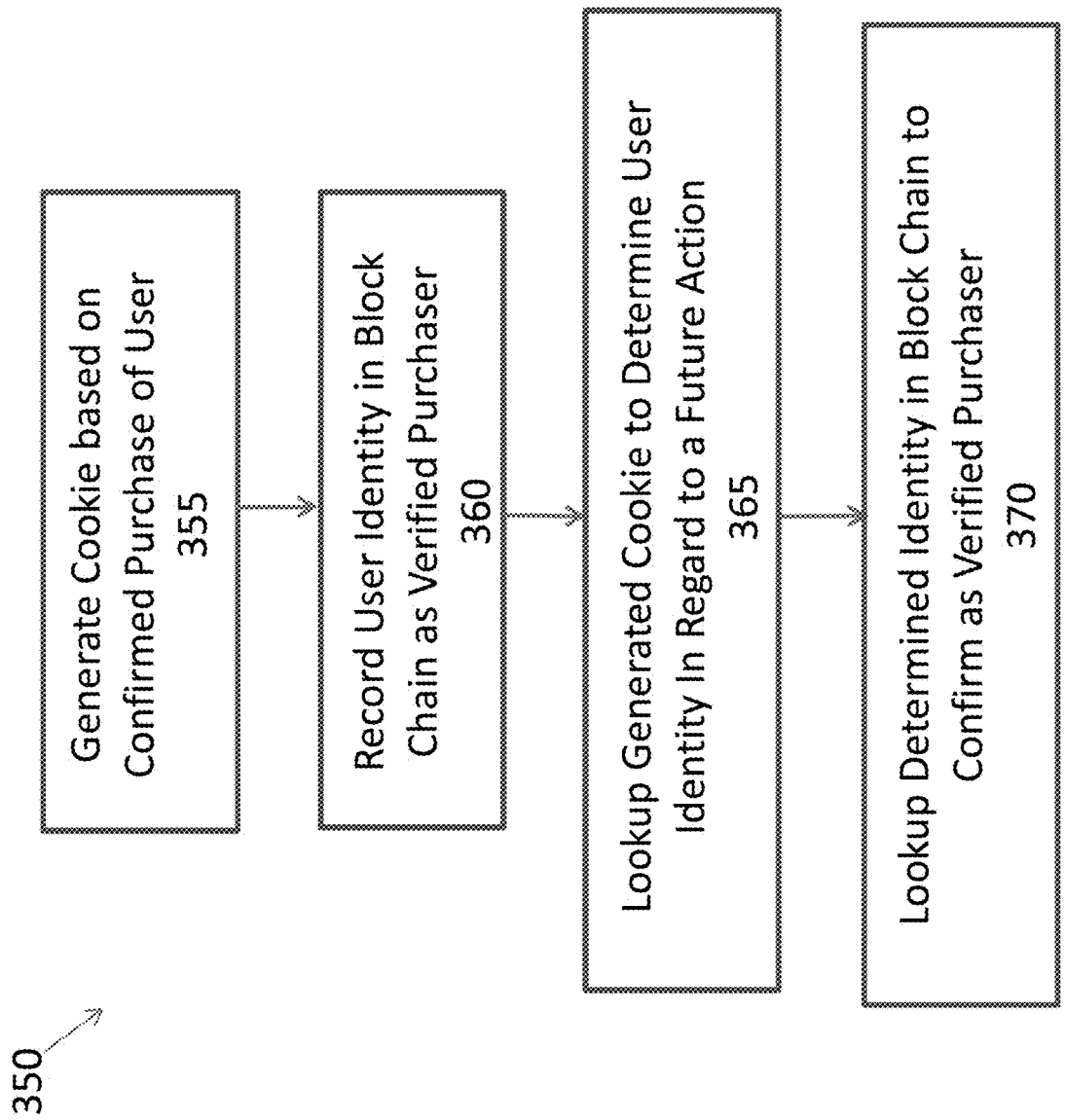
FIG. 3B is a flow diagram illustrating an example method of distinguishing users based on transaction activities according to an embodiment of the present invention.

FIG. 3B is a flow diagram of a method 350 that distinguishes users based on transaction activities according to an embodiment of the present invention. Method 350 begins at step 355 where method 350 generates a proof of purchase cookie based on a confirmed purchase of a user at a merchant website. For example, the method 350 (step 355) may invoke an Advertising Proof Server 275 (as depicted in FIG. 2B) that receives information on the purchase (including user identity) via a pixel tag or script tag placed as part of a pixel conversion or script associated with the purchase confirmation webpage. The Advertising Proof Server 275 may generate the proof of purchase cookie that contain the purchase information (including user identity, such as user identifier, username, PIN, and the like) and write the cookie to the computing device from which the user performed the purchase. Method 350 then continues to step 360, where method 350, based on the confirmed purchase, also signs, dates, and records the user's identity in the block chain database as a verified purchaser. The method 350 may invoke a Merchant Server 285 (as depicted in FIG. 2B) that records the user's identity at the block chain database.

In the future, the user may interact with advertising on the same or different merchant site, or other website. Based on this future interaction, method 350, at step 365, is requested by that website to lookup a generated proof of purchase cookie at the computing device being used by the user. The method 350 (step 365) determines the user's identity contained in the proof of purchase cookie in regard to this action (interaction). Method 350, at step 370, looks up the determined user identity at the block chain database to confirm the user as a verified purchaser (and as such, a person user). The Merchant Server 285 of FIG. 2B may be invoked to look up the user's identity at the block chain database and use the verification of the user identity in regard to the advertising interaction of the user. For example, as indication that the user is not a bot.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of identifying a software robot performing auto generation of click events, the method comprising:
    a token server processor responding to a request from a computing device by sending a packet via a computer network requesting that a computing device produce a proof of work token in communication with a blockchain computing system;
    the token server processor computationally determining whether the computing device is being operated at least in part by a computer implemented software robot that performs auto generation of click events;
    the token server processor estimating the computational cost of the computing device required in producing the proof of work token by comparing the estimated computational cost required by a computing device in producing the proof of work token with a threshold value;
    the token server processor determining whether the computing device includes a trusted platform module (TPM);
    the token server processor computationally determining whether the computing device is being operated at least in part by a software robot that performs auto generation of click events by determining a confidence score;
    the token server processor calculating confidence score based on (i) the estimated computational cost of the computing device required in producing the proof of work token, (ii) whether the computing device includes the trusted platform module (TPM); and
    the token server processor denying the request from the computing device via the computer network if the confidence score is low, such that the computing device is likely to be operated at least in part by a software robot;
    determining the confidence score is low if at least a plurality are determined: (i) the estimated computational cost of the computing device required in producing the proof of work token exceeds the threshold value, (ii) the computing device does not include the trusted platform module (TPM).

2. The method of claim 1, wherein the confidence score is determined by taking into account whether the computing device is a new machine without saved cookies.

3. The method of claim 1, where increasing the confidence score further includes a determination that the computing device has a sufficient amount of CPU resources required to complete a proof of work calculation.

4. A system of identifying a software robot performing auto generation of click events, the system comprising:
   a token server processor configured to respond to a request from a computing device by sending a packet via a computer network requesting that the computing device produce a proof of work token in communication with a blockchain computing system;
   the token server processor configured to computationally determine whether the computing device is being operated at least in part by a computer implemented software robot that performs auto generation of click events;
   the token server processor configured to estimate the computational cost of the computing device required in producing the proof of work token by comparing the estimated computational cost required by the computing device in producing the proof of work token with a threshold value;
   the token server processor configured to determine whether the computing device includes a trusted platform module (TPM);
   the token server processor configured to computationally determine whether the computing device is being operated at least in part by a software robot that performs auto generation of click events by determining a confidence score;
   the token server processor configured to calculate the confidence score based on (i) the estimated computational cost of the computing device required in producing the proof of work token, (ii) whether the computing device includes the trusted platform module (TPM); and
   the token server processor configured to deny the request from the computing device via the computer network if the confidence score is low, such that the computing device is likely to be operated at least in part by a software robot;
   the confidence score is determined to be low if at least a plurality are determined: (i) the estimated computational cost of the computing device required in producing the proof of work token exceeds the threshold value, (ii) the computing device does not include the trusted platform module (TPM).

5. The system of claim 4, wherein the confidence score is determined by taking into account whether the computing device is a new machine without saved cookies.

6. The system of claim 4, where increasing the confidence score further includes a determination that the computing device has a sufficient amount of CPU resources required to complete a proof of work calculation.

* * * * *